No. 854,223. PATENTED MAY 21, 1907.
A. A. KRAMER.
DIPPING TANK.
APPLICATION FILED JAN. 5, 1907.
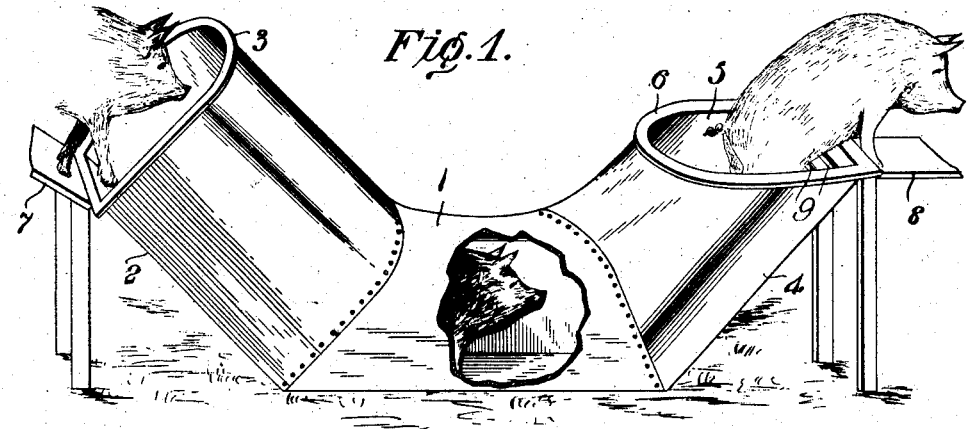
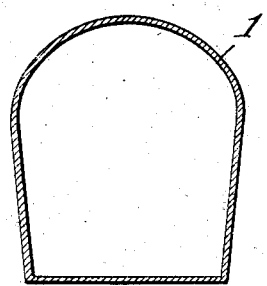
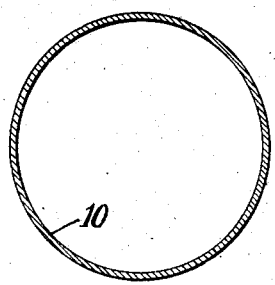
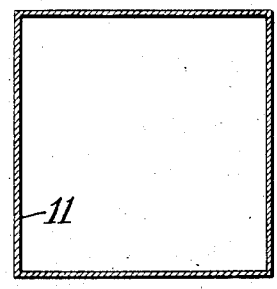
Andrew A. Kramer,
INVENTOR.
WITNESSES:
By
ATTORNEYS

UNITED STATES PATENT OFFICE.

ANDREW A. KRAMER, OF KANSAS CITY, MISSOURI.

DIPPING-TANK.

No. 854,223.  Specification of Letters Patent.  Patented May 21, 1907.

Application filed January 5, 1907. Serial No. 350,980.

*To all whom it may concern:*

Be it known that I, ANDREW A. KRAMER, a citizen of the United States, residing at Kansas City, in the county of Jackson and State of Missouri, have invented a new and useful Dipping-Tank, of which the following is a specification.

This invention relates to tanks for dipping live stock such as hogs, sheep, cattle, dogs, etc., and its object is to provide a simple form of tank which can be embedded within the ground or which can be as effectively used by placing it upon the ground between suitably disposed platforms or inclines.

A still further object is to provide a tank of this character which will prevent splashing when the animal enters it and which will insure the complete immersion of the animal before it can leave the tank.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a perspective view of the tank and showing the same above ground, a portion of the tank being broken away; Fig. 2 is a central transverse section through the intermediate portion only of the tank; Fig. 3 is a central transverse section through the intermediate portion only of a modified form of tank; and Fig. 4 is a similar section through the intermediate portion only of another modified form of tank.

Referring to the figures by characters of reference, 1 is the body or intermediate portion of the tank the same being preferably substantially semi-cylindrical in form and of sufficient height to permit the animal to be dipped to readily pass therethrough. The end portions of this body are beveled and to one of them is fastened the inlet portion 2 which is also semi-cylindrical in cross section and is disposed at an incline, the inlet end of said portion being preferably reinforced by a surrounding flange 3. At the other end of the body 1 is disposed the outlet section 4 of the tank, said section being upwardly inclined and with its outlet end 5 disposed in a substantially horizontal plane and a short distance above the top of the body 1. This outlet end is also preferably reinforced by means of a surrounding flange 6. The flat portion of the body 1 constitutes the base of the tank and is adapted when the entire tank is above ground to rest upon the surface of the ground while the inlet and outlet sections of the tank extend upward at inclines therefrom and constitute ways. An inclined board 7 is supported adjacent the inlet of the section 2 and a platform 8 extends from the outlet 5 of section 4.

In using the tank the same may be filled with a suitable medicated liquid and the hog or other animal to be dipped is placed upon the inclined board 7 so as to necessarily pass into the inlet member 2 through which it will slide into the body 1 and be completely submerged within the liquid contained therein. The animal will pass completely through the liquid and through the outlet section 4 on to platform 8. In passing through the outlet section the liquid will drain from it back into the body 1. As this outlet 4 is comparatively short the animal will have no difficulty in pulling itself therethrough and on to the platform 8. The tank constructed in this manner will prevent liquid from splashing therefrom and becoming wasted when the animal enters, and, moreover, it insures the complete immersion of the animal.

Instead of using the tank above ground as shown and described the same may be embedded within the ground so as to be exposed only at the ends, in which event the tank by reason of its peculiar construction and contour will be prevented from caving in under the weight of the earth pressing against the top and sides thereof.

Instead of forming a tank which is substantially semi-cylindrical in cross section the same may be circular in cross section, as shown at 10 in Fig. 3 or rectangular as shown at 11 in Fig. 4, or of any other cross sectional contour.

In order to enable the animal to readily leave the outlet portion of the tank a plurality of cross strips 9 are located upon the bottom of the outlet portion so that the animal will not slip while traveling up the incline.

The preferred form of the invention has been set forth in the foregoing description but I do not limit myself thereto as I am aware that modifications may be made therein without departing from the spirit or sacrificing the advantages thereof, and I therefore reserve the right to make such changes as fairly fall within the scope of the claims.

What is claimed is:

1. A tank of the character described comprising an intermediate body portion, an inclined inlet portion extending from one end thereof and above the top of the body portion, and an inclined outlet portion extending from the other end of the body portion, said outlet portion having its outer end parallel with and above the body portion.

2. A tank of the character described comprising an intermediate body portion, an inclined inlet portion at one end thereof, and an inclined outlet portion at the other end thereof, the outer ends of said portions being disposed above the plane of the body.

3. A tank of the character described comprising an intermediate portion constituting a liquid receptacle, and inclined end portions extending from opposite ends thereof, the outer ends of the end portions being disposed above the plane of the intermediate portion.

4. A tank of the character described comprising an intermediate portion constituting a liquid receptacle, inclined end portions extending from opposite ends of the intermediate portion and constituting an inlet and an outlet, the outer ends of said end portions being disposed above the plane of the intermediate portion, and the outer end of said outlet end portion being also disposed in a plane substantially parallel with the intermediate portion.

5. In a tank of the character described the combination with an intermediate base portion constituting a liquid receptacle; of inclined inlet and outlet portions extending from opposite ends of the intermediate portion, the outer ends of said end portions being disposed above the plane of the intermediate portion, and means for directing stock into and away from the inlet and outlet portions of the tank respectively.

6. A tank of the character described comprising an intermediate portion having a flat bottom constituting a base, said intermediate portion constituting a liquid holder, and inclined inlet and outlet portions extending from the intermediate portion and having their outer ends disposed above the plane of the intermediate portion.

7. A tank of the character described comprising an intermediate or body portion, said portion having a flat bottom constituting a base, and inclined inlet and outlet portions extending upward from the end portion and having reinforcing flanges at their outer ends, said ends being disposed above the plane of the intermediate portion.

In testimony that I claim the foregoing as my own, I have hereto affixed my signature in the presence of two witnesses:

ANDREW A. KRAMER.

Witnesses:
  LORANA TRASK,
  ELSIE HOSLER.